Aug. 16, 1960

M. C. AGENS 2,949,361

PHOTOSENSITIVE COMPOSITIONS

Filed Aug. 13, 1956

Inventor:
Maynard C. Agens,
by Paul A. Frank
His Attorney.

United States Patent Office 2,949,361 Patented Aug. 16, 1960

2,949,361

PHOTOSENSITIVE COMPOSITIONS

Maynard C. Agens, Schenectady, N.Y., assignor to General Electric Company, a corporation of New York Filed Aug. 13, 1956, Ser. No. 603,568

21 Claims. (Cl. 96—115)

This invention relates to photographic resins possessing depth photosensitivity and thus capable of producing three-dimensional images within said resins. More particularly, this invention relates to photographic compositions capable of producing three-dimensional images which compositions comprise an auric salt dissolved in a polymerizable resin medium. Still more particularly, this invention relates to photographic materials capable of producing three-dimensional images therein which compositions comprise an admixture of (1) a styrene monomer, (2) a liquid, ethylenically unsaturated compound copolymerizable with said styrene monomer, (3) a free-radical generating, polymerization catalyst for unsaturated compounds, and (4) an auric salt; and to the photographs produced by exposing selected areas of said photosensitive compositions to actinic light and completing the polymerization of the admixture. This invention also relates to a process of preparing three-dimensional images within a resin which process comprises: (1) preparing an admixture of (*a*) a styrene monomer, (*b*) a liquid, ethylenically unsaturated compound copolymerizable with said styrene monomer, (*c*) a free-radical generating, polymerization catalyst for unsaturated compounds, and (*d*) an auric salt; (2) partially polymerizing the composition of (1) to the point of incipient gelation; (3) exposing selected areas of said partially polymerized composition to actinic light; and (4) thereupon completing the polymerization until a three-dimensional image, comprising gold nuclei, is developed within the solid resinified resin. This invention also relates to the photographs produced by this method.

The features of the invention desired to be protected herein are pointed out with particularity in the appended claims. The invention itself, together with further objects and advantages thereof, may be understood by reference to the following description taken in connection with the accompanying drawing in which:

Figure 1:
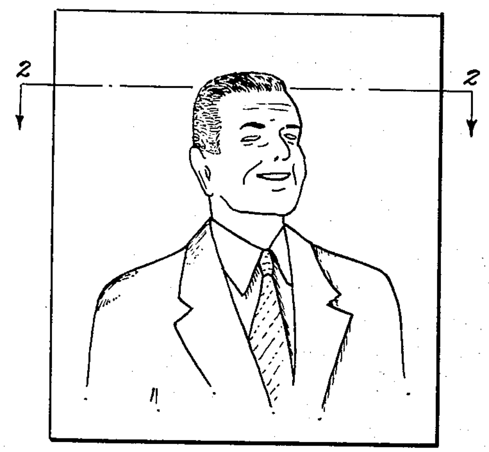
Fig. 1 represents the plan view of a solid piece of resin and containing a portrait throughout the depth of an otherwise colorless resin.
Figure 3:
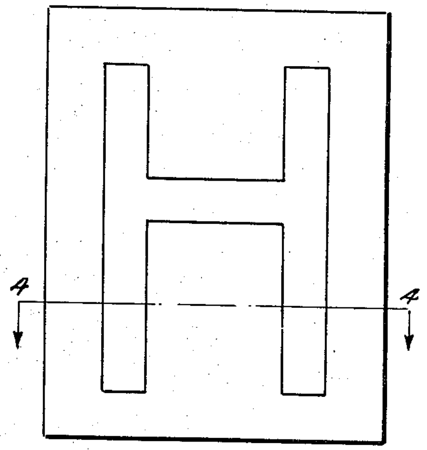
Fig. 3 is a solid piece of resin containing throughout its depth the letter "H" within the mass of an otherwise colorless resin.
Figure 2:
Fig. 2 is a sectional view on the line 2—2 of Fig. 1 showing that the three-dimensional image is in depth throughout the resin.
Figure 4:
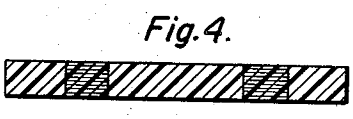
Fig. 4 is a sectional view on line 4—4 of Fig. 3 showing that the image is in depth throughout the resin. In this figure the direction of the image "H" within the resin is parallel to the direction of the radiation which in this figure is perpendicular to the face of the resin.
Figure 5:
Fig. 5 is a sectional view on line 4—4 in Fig. 3 showing that the three-dimensional image is in depth throughout the resin. In this figure the direction of the image "H" within the resin is parallel to the direction of the radiation, which in this figure is at an acute angle to the face of Fig. 3.
Figure 6:
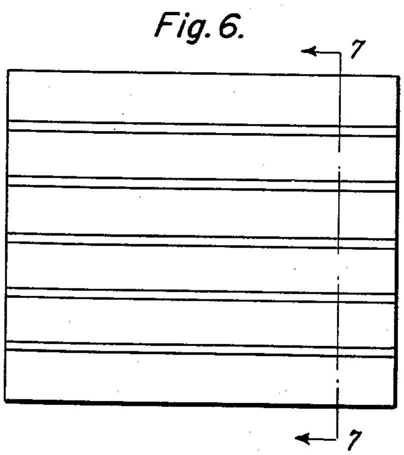
Fig. 6 is a plan view of a solid piece of resin having an image of linear strips prepared in accordance with this invention. Apart from the linear strips, the resin is colorless.
Figure 7:
Fig. 7 is a sectional view on line 7—7 of Fig. 6 showing the three-dimensional image is in depth throughout the resin. In this figure the direction of the radiation is perpendicular to the face of the resin.
Figure 8:
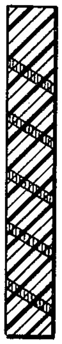
Fig. 8 is a sectional view on line 7—7 of Fig. 6 showing the three-dimensional image is in depth throughout the resin. In this figure the direction of the image of the strips is parallel to the direction of the radiation which is on an acute angle to the face of the plate.

The spaces between the strips in Figures 6, 7 and 8 are colorless and transparent and are of a sufficient width so that they can be used as louvers whereby light can be transmitted perpendicular to the face of the resin (Fig. 7) or at an angle to the face of the resin (Fig. 8). The angle of these lines can be varied to any suitable angle by changing the direction of the radiation in relation to the face of the resin.

Although the art of photographic, resinous materials which depend principally on photosensitive salts for their image is old, all of the heretofore disclosed compositions possessed surface rather than depth photosensitivity. Thus, when the photographic materials containing silver salts as taught by the prior art are exposed to actinic light, merely a surface image is produced.

I have now discovered compositions which are photosensitive throughout their depth and thus capable of producing images in depth, i.e., a three-dimensional image throughout the depth of a resin as contrasted to a surface effect. These photographic materials comprise an admixture of (1) a styrene monomer, (2) a liquid, ethylenically unsaturated compound copolymerizable with said styrene monomer, (3) polymerization catalyst for unsaturated compounds, and (4) an auric salt. The process of this invention comprises: (1) preparing an admixture of (*a*) a styrene monomer, (*b*) a liquid, ethylenically unsaturated compound copolymerizable with said styrene monomer, (*c*) a free-radical generating, polymerization catalyst for unsaturated compounds, and (*d*) an auric salt; (2) partially polymerizing the composition of (1) to the incipient gel state; (3) exposing selected areas of said partially polymerized composition to actinic light, such as ultraviolet light, and (4) completing the polymerization until a three-dimensional, photographic image, comprising gold nuclei, is developed within the solid resin.

Although the compositions described above are capable of producing images in depth, various modifying agents are preferably added in small but significant quantities, in the order of 1% or less, to the composition in order to enhance certain properties. Thus, for example, hydroquinone is added for enhanced stability, copper salts are added for enhanced stability and for sharper images, cobalt salts are added for a more accelerated cure and a more stable image, etc.

The resin component of the photosensitive composition comprises: (1) a styrene monomer or a low molecular weight polystyrene capable of further polymerization, and (2) a liquid, ethylenically unsaturated compound copolymerizable with styrene.

Although unsaturated alkyd resins are preferred, other unsaturated compounds which contain at least one $CH_2=C<$ group and are copolymerizable with styrene may also be employed, among which may be mentioned methacrylic and acrylic acid esters, for example, alkyl esters of methacrylic and acrylic acids (e.g. methyl, ethyl, propyl, butyl, decyl, etc. esters); methacrylic and acrylic diesters of alkylene glycols, such as ethylene glycol, polyalkylene glycols, such as diethylene glycol, triethylene glycol, tetraethylene glycol, etc.; alkenyl methacrylates, such as crotyl methacrylate, etc.; diallyl phthalate; vinyl acetate; dialkyl fumarates or maleates; etc.

Although the ratio of styrene to the unsaturated compound can be varied within wide limits, the copolymer thereby produced should be capable of being controlled so that a gel can be formed which can later be polymerized to a solid. For example, the percent of styrene used with an alkyd resin can vary between about 20 to 75% or higher, but preferably between 30 to 50% based on total weight of the total resin composition. Optimum percents will depend on the specific alkyd employed. As of present knowledge, it is believed a styrene monomer is necessary to produce photosensitive composition of enhanced properties. In addition to styrene itself alkyl ring substituted styrenes and such as those described in Schildknecht, "Vinyl and Related Polymers," John Wiley & Sons (1952), p. 130, Table 1, and alkoxy ring substituted styrenes, such as those described in the said Schildknecht text, p. 132, Table 3, may also be employed. These styrene monomers are usually liquids which are soluble in the alkyd component.

The alkyd resins (also known as polyesters) copolymerizable with styrene in accordance with this invention are those which contain a plurality of alpha, beta enal (i.e. —C=C—C=O)

groups. The simplest resins of this group are those resinous polyesters produced by the esterification of an alpha, beta-ethylenically unsaturated dicarboxylic organic acid with a polyhydric alcohol.

Among the useful dihydric alcohols are those which contain either primary hydroxyl groups or secondary hydroxyl groups since they are more rapidly esterified, with glycols being generally preferable. The particular choice of glycol is governed by the fact that when it is incorporated into the alkyd, said alkyd can be copolymerized with styrene to form a gel which can later be further polymerized to a solid. Although suitable dihydric alcohols comprise diethylene glycol, dipropylene glycol, triethylene glycol, tetraethylene glycol, etc., the preferable glycols are ethylene glycol, propylene glycol, and mixtures thereof.

Athough I prefer to use maleic acid, other alpha, beta unsaturated dicarboxylic organic acids which can also be used in preparing the alkyd resins are fumaric, itaconic, citraconic, mesaconic acids, etc., and any of the foregoing acids could be substituted in part with other monocarboxylic olefinic acids such as acrylic, methacrylic, cinnamic, etc. acids. Small quantities of tricarboxylic acid as well as trifunctional inorganic acids or esters may also be used. Obviously, various mixtures of these acids can also be used.

The alkyd resins may be modified with other substances which are often used in alkyd resins, i.e., monohydric alcohols, monobasic acids or dibasic acids, e.g., phthalic acid, succinic acid, glutaric acid, adipic acid, azelaic acid, sebacic acid, etc., which do not contain groups polymerizable reactive with styrene. These modifying agents are usually used as diluents or plasticizers, chemically combined in the resin in a manner so as to improve the mechanical properties of the resins.

The alkyd resins may be prepared from a controlled amount of polyhydric alcohols other than the glycols or from mixtures including a glycol and a controlled amount of a higher polyhydric alcohol. Examples of these are glycerol, pentaerythritol, etc.

It is also possible to introduce initially into the alkyd resin a certain number of groupings of the type $CH_2=C<$ through the use of olefinic compounds. One way of accomplishing this, for example, is by direct esterification of an unsaturated alcohol containing a $CH_2=C<$ group. Examples of such alcohols are allyl and methallyl alcohols.

The alkyd resins of this invention may be modified in the same general manner as other alkyd resins. However, if a monohydric alcohol or a dibasic acid which does not contain polymerizable olefinic groups is used, the proportion of such substances should not be so high as to avoid gelation or later solidification. By the use of a relatively large proportion of an olefinic dibasic acid, e.g., maleic, in the alkyd resin, a harder and tougher polymer is produced upon subsequent copolymerization with styrene. On the other hand, if the alkyd resin is obtained from a relatively small proportion of polymerizably active dibasic acid and a relatively large proportion of acids which do not contain groups polymerizably active with styrene, a softer and more flexible resin results upon polymerization with styrene. The same effect is produced by the introduction of other inactive ingredients. By varying the ingredients and the proportions of the ingredients, resins may be obtained having properties which one desires in the final resin.

One of the difficulties in using the polymer composition comprising a styrene monomer and an unsaturated alkyd resin described above is that it is difficult to store in the mixed form because polymerization may take place even at room temperature within a comparatively short time. Moreover, when it is desired to polymerize these compositions according to this invention, the reaction can become so vigorous that it may be difficult to control. To overcome these difficulties it is advisable to incorporate a small proportion of a polymerization inhibitor in the polymer composition. When it is desired to use the polymer composition, a small percentage of a polymerization catalyst is added, sufficient to overcome the effect of the inhibitor as well as to promote the polymerization. By careful control of the concentrations of inhibitor and catalyst, a suitable gel is obtainable with a good reaction velocity which after exposure can be hardened to a solid.

A wide variety of suitable polymerization inhibitors can be used. Although copper salts, such as copper naphthenate, etc. are preferred because they also promote deep, sharp images, other suitable polymerization inhibitors, such as hydroquinone, etc. can also be employed. It has been found that the combination of hydroquinone and copper salts not only makes an excellent inhibitory system but also produces improved images.

The concentration of inhibitor based on weight of resin is preferably low and I have found that less than about 1% is usually sufficient. However, I prefer to use only about 0.05% to about 0.1%, based on weight of total resin composition.

Any of the known free-radical polymerization catalysts for unsaturated compounds may be used. These polymerization catalysts include the organic peroxides, such as aldehydic, ketonic and acidic peroxides. Although methyl ethyl ketone peroxide is preferred, other catalysts comprise the acidic peroxides, e.g. benzoyl peroxide, phthalic peroxide, succinic peroxide and benzoyl acetic peroxide; the hydroperoxides, e.g. tertiary butyl hydroperoxide, etc.

In addition to the peroxides other free-radical polymerization catalysts for unsaturated compounds can also be used either alone or in conjunction with peroxides. Among these catalysts are the acyloins possessing the structure

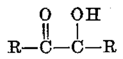

described in U.S. Patent 2,367,661, Agre, such as benzoin, 3-hydroxy-4-methylpentanone-2, butyroin, glycolic aldehyde, etc., aryl acyloins possessing the structure

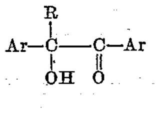

described in U.S. Patent 2,722,512 such as $\alpha$-ethyl benzoins, acyloin ether possessing the structure $$R''-O\underset{\underset{R}{|}}{C}H-\overset{\overset{O}{\|}}{C}-R'$$

described in U.S. Patent 2,448,828, azo compounds such as "Porofor-N" ($\alpha,\alpha'$-azodiisobutyronitrile) $\alpha,\alpha'$-azodivaleronitrile, etc., persulfates, etc.

The concentration of polymerization catalysts employed is usually small, from about 0.1 part of catalyst per hundred parts of the resin composition to about 2 parts per hundred parts of the reactive mixture. If an inhibitor be present, up to 5% or even more of catalyst may be necessary according to the concentration of inhibitor.

In addition suitable catalysts for decomposing peroxides may also be used as polymerization accelerators, for example, cobalt salts, etc.

Cobalt salts are particularly desirable since they also aid in fixing the image. Although I do not wish to be bound by theoretical considerations, such fixing might occur by two possible mechanisms: (1) by viscosity increase of the plastic, and (2) chemical reaction. Upon exposure to radiation, it is believed that invisible gold nuclei are formed. These nuclei would tend to diffuse quite rapidly if the viscosity of the medium was not sufficient to hold these nuclei in place, thus resulting in a fuzzy image. It is believed that one of the roles of the cobalt accelerator is to bring the plastic medium to a high enough viscosity at the point of nuclei formation as soon as they form in order to make further diffusion difficult. Although the viscosity is increased by peroxides alone, the use of an accelerator like a cobalt salt further increases the viscosity thus holding these nuclei more firmly in place.

In regard to chemical action it is believed that the cobalt salts react with any residual unreduced gold salt in the resin in such a way that it is insensitive to reduction by daylight. In this way any gold salt remaining in the final product is fixed against further activity.

The presence of a gold salt in these photosensitive compositions is critical for producing the photosensitive compositions of this invention. Only a very small amount of gold is required in this process, for example about .01 to 0.1% but preferably .03 to .05%, calculated as gold based on the weight of total resin. Too little gold decreases the sensitivity and produces very little coloration. On the other hand, an excess of gold seems to have little if any effect on photosensitivity. The gold is preferably introduced into the plastic as gold chloride, preferably in the form of $AuCl_3 \cdot HCl \cdot 3H_2O$. It is believed that, among other things, one reason for the unusual results obtained from this invention is due to the solubility of the gold salt in the resin composition.

The actinic light used in this invention which is capable of producing a coloration in the exposed areas while the unirradiated areas remain substantially unchanged are short wave radiation such as that found in the ultra violet range. Of course, radiation in the fringe areas of visible and infra-red are somewhat, although less, effective than those in the ultra violet range. I can advantageously use radiation having wave lengths between about 2500 and 5000 Angstroms, but preferably 3000–4000 Angstroms. Any conventional source of this radiation can be employed such as a carbon arc, quartz-mercury arc, etc. The duration of exposure to these radiations necessary to carry out this invention will vary with various factors, such as for example, the intensity of the effective radiation which is related to the source of radiation, its distance from the photosensitive materials, the light transmission of the material used to form the image such as photographic film, glass photographic plates, etc. The light transmission of clear photographic film at 3650 A. is about 60% while that of clear glass is about 80%. When film bases have on it various densities of silver, this condition reduces the transmission in certain areas of the negative. Because of its relatively high transmission, I prefer to use negatives made of glass, particularly ultra violet transmitting glass. Other means of producing images can also be used such as cut-out patterns, projection systems, etc.

In order to produce an image of optimum properties such as sharpness of image, etc. the state of the resin at the time of exposure is important. During development invisible gold nuclei are formed which agglomerate to form an image. If the liquid resin is exposed to radiation at too early a stage in its polymerization, there is a tendency to get fuzzy indistinct images due to mobility or shifting of gold nuclei in the liquid area. If the polymer is too hard due to overpolymerization, there is too little mobility of the gold nuclei and the image is badly underdeveloped since the gold nuclei cannot agglomerate. The best time to start the exposure is just as the polymer is about to gel. The state of the incipient gel will be evident to one skilled in the art as that state at which there is little mobility due to flowing of the liquid state and little rigidness due to overcure.

Since heat of polymerization affects the rate of polymerization, it is advantageous that this be controlled. Since the polymer is photopolymerizable, it is desirable to make the photosensitive polymer of such a cross section that heat of polymerization is easily dissipated or that the photosensitive polymer is of such even cross section that the heat is dissipated at the same rate over the entire area. The effect of exotherm is evident when a plastic of uneven cross section (such as one obtains from the resin cast or a watch glass) is exposed to actinic light. Because of lesser heat dissipation due to faster polymerization, the thicker section in the center becomes over-heated and further cured than the radial areas, and hence, the center of the picture comes out badly underdeveloped. Of course, by controlling the intensity of radiation in various areas of the picture, one can remedy this defect.

This invention may best be understood by reference to the following examples which are presented by way of illustration and not by way of limitation. All parts are by weight in grams unless otherwise indicated.

EXAMPLE 1

An alkyd resin was prepared by reacting 0.75 mole of maleic anhydride, 1.25 moles of phthalic anhydride and 2.1 moles of propylene glycol. These ingredients were placed in a reactor equipped with a stirrer, and nitrogen inlet, and a trap for removing water formed during the reaction. Nitrogen was bubbled through the reaction mixture which was heated at 180–210° C. for 6 hours. During the last half hour the nitrogen flow was increased to remove the last traces of water and unreacted acid. The product after reaction had an acid number of less than 35.

In all of the following examples the polymer composition comprised 30 parts by weight of styrene and 70 parts by weight of the above alkyd resin and will be referred to as "polymer composition."

The light sensitive material used in the specific examples was gold chloride. It was added to the polymer composition from a stock solution made by dissolving 15 grains of $AuCl_3 \cdot HCl \cdot 3H_2O$ in 100 g. of monomeric methyl methacrylate (hereafter called "gold solution").

The catalyst used herein was prepared by dissolving 60 parts of methylethyl ketone peroxide in 40 parts of dimethyl phthalate. This will be referred to as "catalyst solution." The source of light was a water-cooled mercury arc lamp capable of emitting wave length of 3000–4000 A.

Although images may be obtained by using a mixture of (1) a styrene monomer (2) an $\alpha,\beta$-ethylenically unsaturated alkyd resin copolymerizable with said styrene monomer, (3) a free-radical generating, polymerization catalyst for unsaturated compounds, and (4) a gold salt, the addition of cetrain modifying agents or combinations of modifying agents produces improved images. In order to show the effects of modifying agents on images, the basic combination of the four ingredients listed above was modified with (1) polymerization inhibitors for unsaturated compounds, such as copper naphthenate and hydroquinone, and (2) polymerization accelerators for unsaturated compounds such as cobalt naphthenate.

A series of images were prepared in the following manner. Forty parts of the polymer composition, 0.5 part of catalyst solution, 3 cc. of gold solution, and various other modifiers (as indicated) were added to the mixture. These mixtures were allowed to polymerize until they were just about to gel. This time varied from ½ hour to 3 hours depending on the particular mixture. Thereupon this gel was placed in a shallow dish, a glass negative was placed on top of the dish, and then exposed to the lamp at a distance of 10 inches from the negative for the time indicated. Thereupon, the exposed gel was developed and solidified by gently heating at about 60–70° C. for 30 minutes. All examples had the same proportion of polymer composition, catalyst solution, and gold solution. Any other modifiers are indicated. The results are presented in Table I. In the table Cu refers to a copper naphthenate solution containing 0.0292 g. of Nuodex (8% Cu) copper naphthenate/100 cc. of styrene, and Co refers to a cobalt naphthenate solution containing 3.667 g. of Nuodex (6% Co)/cobalt naphthenate 100 cc. of styrene. The hydroquinone solution used contained 0.0467 g. of hydroquinone/100 cc. of styrene.

*Table I*

| Example | Modifier | Amt. of Modifier, cc. | Exposure Time, min. | Results |
|---|---|---|---|---|
| 2 | None | 0 | 20 | Image produced, although somewhat unstable. |
| 3 | Cu | 3 | 20 | Do. |
| 4 | hydroquinone | 3 | 20 | Do. |
| 5 | Co | 0.5 | 10–15 | Too rapid gel, under-developed image. |
| 6 | Cu +<br>hydroquinone | 3<br>3 | 20 | Image produced, although somewhat unstable. |
| 7 | Co +<br>hydroquinone | 0.5<br>3 | 10 | Good stable image. |
| 8 | Cu +<br>Co | 3<br>3 | 20 | Do. |
| 9 | Cu +<br>Co +<br>hydroquinone | 3<br>3<br>3 | 20 | Do. |

Since it is desirable to get an (1) image, (2) with good contrast and sharpness, and (3) to hold this image over a period of time (i.e. a stable image), it appears that the following ingredients listed in Table II are advantageously present for achieving these properties. In this table the symbols have the same meaning as in Table I.

*Table II*

| Ingredient | Property |
|---|---|
| Au | Produces images. |
| Methyl ethyl ketone peroxide | Enhances polymerization. |
| Hydroquinone | Enhances stability. |
| Cu | Enhances stability and also produces sharper images. |
| Co | Produces faster cure and stabler images. |

EXAMPLE 10

This example illustrates the effect of a pallidium salt on the compositions of this invention. The solutions employed are the same as those previously described except as otherwise indicated.

A composition comprising 80 parts of polymer composition, 1 part of catalyst solution, 55 cc. of gold solution, and 0.3 cc. of a palladium salt solution (0.5 g.

$$H_2PdCl_4 \cdot 2H_2O$$

in 33 g. methyl methacrylate acidified with a drop of concentrated hydrochloric acid), 6 cc. of cobalt solution and 5 cc. of copper solution was allowed to polymerize for ¾ hour. Thereupon, this resin solution was placed in a shallow dish, a negative was placed on top of the dish and then exposed to the lamp at a distance of about 10 inches from the negative for 20 minutes. The exposed resin was then developed and solidified by gently heating at about 60–70° C. for 30 minutes to produce a three-dimensional image throughout the depth of the resin.

In contrast to the blue to bluish red colorations obtained by using gold alone, palladium-gold photosensitive resins produced megenta prints. This is unexpected since palladium itself is not photosensitve and it appears that small amounts of gold salts are necessary to render palladium photosensitive. Palladium is preferably added in the form of the chloride and can be present in amounts of .01 to .05%, but preferably .01 to .02% as palladium based on weight of the resin.

EXAMPLE 11

This example illustrates the effect of a metal carbonyl on improving the light sensitivity of the photosensitive resin. A composition was prepared in the manner of Example 2 except that 0.08 part of molydenum carbonyl was added. The remainder of the process was carried out in a similar manner except that a shorter exposure time was required to produce an image of similar intensity (10 minutes in contrast to 20 minutes in Example 2).

One interesting application of this invention is in the production of louvers in which the depth images are produced at an angle to the face of the surface of the photosensitive by placing a negative containing parallel lines and directing the light at an angle to the face of the resin. In this way inclined darkened areas are produced similar to those shown in Fig. 8. These panels of permanently set louvers can be used to direct light in the desired direction, either up or down.

Aliphatic azo compounds can be used in conjunction with or in place of the peroxide disclosed in the above examples. A typical example of an aliphatic azo compound is Porofor-N ($\alpha,\alpha'$-azodiisobutyronitrile). Because it is very sensitive to light, Porofor-N increases the rate of polymerization and the photosensitivity of the resin.

EXAMPLE 12

A composition was prepared in the manner of Example 2 except that Porofor-N was used in place of the peroxide. Gel time was 1 hour, exposure was 15 minutes, and the final heat treatment 30 minutes. The resulting image has a red-blue coloration.

EXAMPLE 13

The process of Example 2 was repeated except that copper 2-ethyl hexoate was employed in place of copper naphthenate. Similar results were obtained.

The products of this invention are useful in photography, decorating, displaying, etc. They can be used to produce photographs in depth which are of permanent storable nature. Since they are very effective when viewed by transmitted light, they can be used as decorative panels or murals. Decorative designs can be incorporated into plastic panels or in thicker sections which would later be machined to the desired shape. The louvers prepared in accordance with this invention can be used as permanently set light-directing means for displays, windows, etc.

While the present invention has been described by reference to particular embodiments and examples thereof, variations will readily occur to those skilled in the art.

It is therefore intended in the appended claims to cover all equivalents as may be in the true spirit of the foregoing description.

What I claim as new and desire to secure by Letters Patent of United States is:

1. A photosensitive composition capable of producing a three-dimensional photographic image which comprises the product produced by partially polymerizing to the incipient gel state a mixture comprising (1) a styrene monomer selected from the group consisting of styrene, alkyl ring-substituted styrenes and alkoxy ring-substituted styrenes, (2) a compound copolymerizable with said styrene monomer, which is selected from the group consisting of compounds at least one $CH_2{=}C{<}$ group and liquid resinous polyesters of an ethylenically unsaturated dicarboxylic acid and a polyhydric alcohol, (3) a free-radical generating polymerization catalyst and (4) an auric salt.

2. A photosensitive composition capable of producing a three-dimensional photographic image which comprises the product produced by partially polymerizing to the incipient gel state a mixture comprising (1) a styrene monomer selected from the group consisting of styrene, alkyl ring-substituted styrenes and alkoxy ring-substituted styrenes, (2) at least one liquid, resinous polyester of an ethylenically unsaturated dicarboxylic acid and a polyhydric alcohol, (3) a free-radical generating polymerization catalyst, and (4) an auric salt.

3. A photosensitive composition capable of producing a three-dimensional photographic image which comprises the product produced by partially polymerizing to the incipient gel state a mixture comprising (1) styrene monomer, (2) at least one liquid, resinous polyester of an ethylenically unsaturated dicarboxylic acid and a polyhydric alcohol, (3) a free-radical generating polymerization catalyst, and (4) an auric salt.

4. A photosensitive composition capable of producing a three-dimensional photographic image which comprises the product produced by partially polymerizing to the incipient gel state a mixture comprising (1) styrene, (2) at least one liquid, resinous polyester of an ethylenically unsaturated dicarboxylic acid and a polyhydric alcohol, (3) a peroxide, and (4) an auric salt.

5. A photosensitive composition capable of producing a three-dimensional photographic image which comprises the product produced by partially polymerizing to the incipient gel state a mixture comprising (1) styrene, (2) at least one liquid, resinous polyester of an ethylenically unsaturated dicarboxylic acid and a polyhydric alcohol, (3) an azo polymerization catalyst, and (4) an auric salt.

6. A photosensitive composition capable of producing a three-dimensional photographic image which comprises the product produced by partially polymerizing to the incipient gel state a mixture comprising (1) a styrene monomer selected from the group consisting of styrene, alkyl ring-substituted styrenes, and alkoxy ring-substituted styrenes, (2) a compound copolymerizable with said styrene monomer, which is selected from the group consisting of compounds containing at least one $CH_2{=}C{<}$ group and liquid, resinous polyesters of an ethylenically unsaturated dicarboxylic acid and a polyhydric alcohol, (3) a free-radical generating polymerization catalyst, (4) a polymerization inhibitor, (5) a polymerization accelerator, and (6) an auric salt.

7. A photosensitive composition capable of producing a three-dimensional photographic image which comprises the product produced by partially polymerizing to the incipient gel state a mixture comprising (1) styrene, (2) a propylene glycol-maleate-phthalate alkyd resin, (3) methyl ethyl ketone peroxide, (4) copper naphthenate, (5) cobalt naphthenate, (6) hydroquinone, and (7) auric chloride.

8. The method of preparing three-dimensional, photographic images within a resin which comprises (1) preparing an admixture of (*a*) a styrene monomer selected from the group consisting of styrene, alkyl ring-substituted styrenes and alkoxy ring-substituted styrenes, (*b*) a compound copolymerizable with said styrene monomer, which is selected from the group consisting of compounds containing at least one $CH_2{=}C{<}$ group and liquid, resinous polyesters of an ethylenically unsaturated dicarboxylic acid and a polyhydric alcohol, (*c*) a free-radical generating polymerization catalyst and (*d*) an auric salt; (2) partially polymerizing the composition of (1) to the incipient gel state; (3) exposing selected areas of said partially polymerized composition to actinic light; and (4) thereafter continuing the polymerization until a three-dimensional photographic image comprising gold nuclei is developed within the solid resin.

9. The solid, resinified composition prepared by the method of claim 8 containing within its depth, gold nuclei which form a three-dimensional photographic image.

10. A method of preparing three-dimensional photographic images within a resin which comprises (1) preparing an admixture of (*a*) a styrene monomer selected from the group consisting of styrene, alkyl ring-substituted styrenes, and alkoxy ring-substituted styrenes, (*b*) at least one liquid, resinous polyester of an ethylenically unsaturated dicarboxylic acid and a polyhydric alcohol, (*c*) a free-radical generating polymerization catalyst, and (*d*) an auric salt; (2) partially polymerizing the composition of (1) to the incipient gel state; (3) exposing selected areas of said partially polymerized composition to actinic light; and (4) thereafter continuing the polymerization until a three-dimensional photographic image comprising gold nuclei is developed within the solid resin.

11. The solid, resinified composition prepared by the method of claim 10 containing within its depth, gold nuclei which form a three-dimensional photographic image.

12. A method of preparing three-dimensional photographic images within a resin which comprises (1) preparing an admixture of (*a*) styrene monomer, (*b*) at least one liquid, resinous polyester of an ethylenically unsaturated dicarboxylic acid and a polyhydric alcohol, (*c*) a free-radical generating polymerization catalyst, and (*d*) an auric salt; (2) partially polymerizing the composition of (1) to the incipient gel state; (3) exposing selected areas of said partially polymerized composition to actinic light; and (4) thereafter continuing the polymerization until a three-dimensional photographic image comprising gold nuclei is developed within the solid resin.

13. The solid, resinified composition prepared by the method of claim 12 containing within its depth, gold nuclei which form a three-dimensional photographic image.

14. A method of preparing three-dimensional photographic images within a resin which comprises (1) preparing a mixture of (*a*) styrene monomer, (*b*) at least one liquid, resinous polyester of an ethylenically unsaturated dicarboxylic acid and a polyhydric alcohol, (*c*) a peroxide, and (*d*) an auric salt; (2) partially polymerizing the composition of (1) to the incipient gel state; (3) exposing selected areas of said partially polymerized composition to actinic light; and (4) thereafter continuing the polymerization until a three-dimensional photographic image comprising gold nuclei is developed within the solid resin.

15. The solid, resinified composition prepared by the method of claim 14 containing within its depth, gold nuclei which form a three-dimensional photographic image.

16. A method of preparing three-dimensional photographic images within a resin which comprises (1) preparing a mixture of (*a*) styrene monomer, (*b*) at least one liquid, resinous polyester of an ethylenically unsaturated dicarboxylic acid and a polyhydric alcohol, (*c*) an azo polymerization catalyst and (*d*) an auric salt; (2) partially polymerizing the composition of (1) to the incipient gel state; (3) exposing selected areas of said partially polymerized composition to actinic light; and (4) thereafter continuing the polymerization until a three-dimensional photographic image comprising gold nuclei is developed within the solid resin.

17. The solid, resinified composition prepared by the method of claim 16 containing within its depth, gold nuclei which form a three-dimensional photographic image.

18. A method of preparing three-dimensional photographic images within a resin which comprises (1) preparing a mixture of (*a*) a styrene monomer selected from the group consisting of styrene, alkyl ring-substituted styrenes and alkoxy ring-substituted styrenes, (*b*) a compound copolymerizable with said styrene monomer, which is selected from the group consisting of compounds containing at least one $CH_2{=}C{<}$ group and liquid, resinous polyesters of an ethylenically unsaturated dicarboxylic acid and a polyhydric alcohol, (*c*) a free-radical generating polymerization catalyst, (*d*) a polymerization inhibitor, (*e*) a polymerization accelerator, and (*f*) an auric salt; (2) partially polymerizing the composition of (1) to the incipient gel state; (3) exposing selected areas of said partially polymerized composition to actinic light; and (4) thereafter continuing the polymerization until a three-dimensional photographic image comprising gold nuclei is developed in the solid resin.

19. The solid, resinified composition prepared by the method of claim 18 containing within its depth, gold nuclei which form a three-dimensional photographic image.

20. A method of preparing three-dimensional photographic images within a resin which comprises (1) preparing a mixture of (*a*) styrene, (*b*) a propylene glycol-maleate-phthalate alkyd resin, (*c*) methyl ethyl ketone peroxide, (*d*) copper naphthenate, (*e*) cobalt naphthenate, (*f*) hydroquinone, and (*g*) auric chloride; (2) partially polymerizing the composition of (1) to the incipient gel state; (3) exposing selected areas of said partially polymerized composition to actinic light; and (4) thereafter continuing the polymerization until a three-dimensional photographic image comprising gold nuclei is developed in the solid resin.

21. The solid, resinified composition prepared by the method of claim 20 containing within its depth, gold nuclei which form a three-dimensional photographic image.

References Cited in the file of this patent

UNITED STATES PATENTS

| | | |
|---|---|---|
| 2,195,362 | Ellis | Mar. 26, 1940 |
| 2,305,224 | Patterson | Dec. 15, 1942 |
| 2,515,937 | Stookey | July 18, 1950 |
| 2,673,151 | Gerhart | Mar. 23, 1954 |
| 2,760,863 | Plambeck | Aug. 28, 1956 |